Patented Oct. 31, 1922.

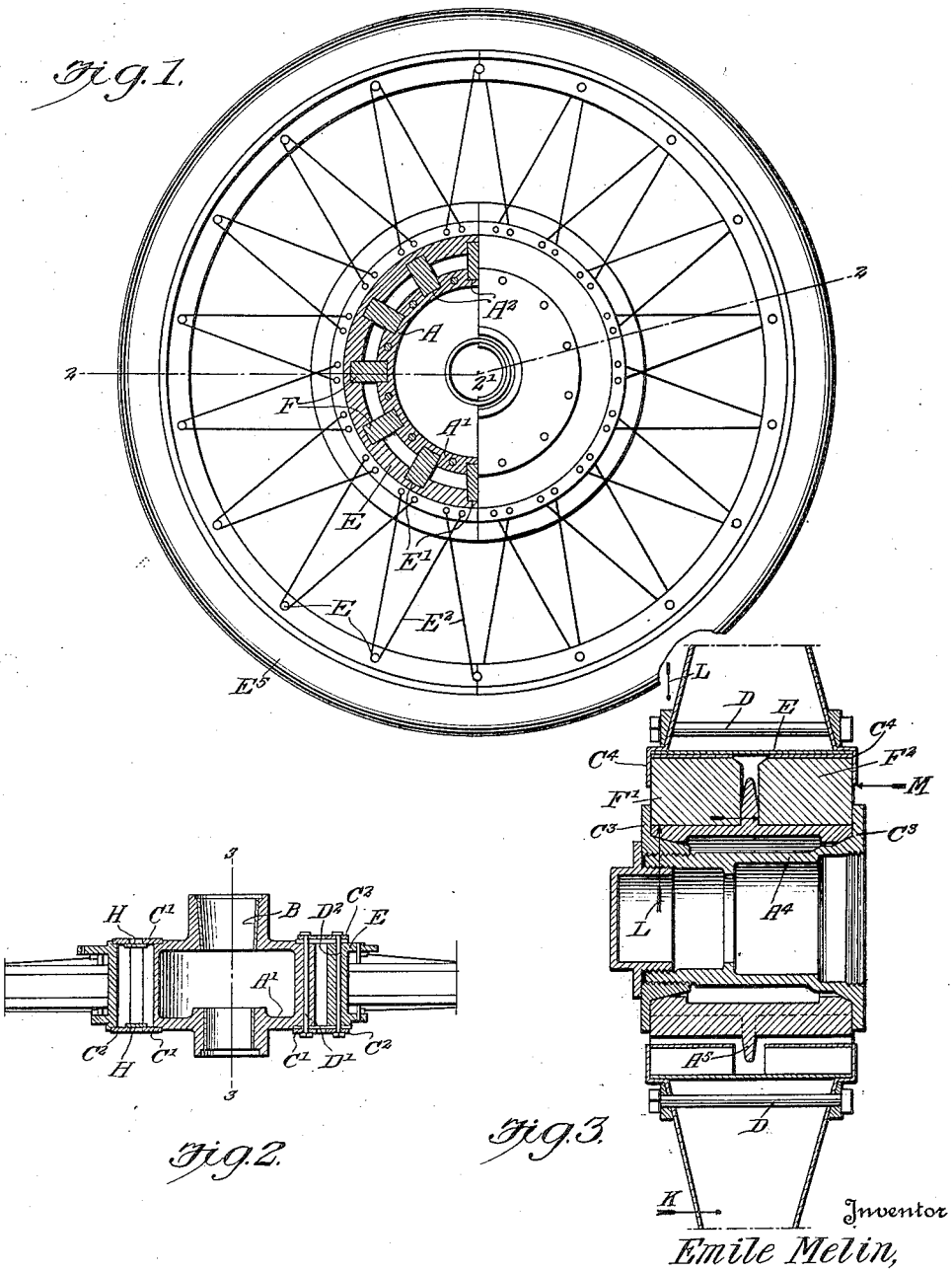

1,433,638

UNITED STATES PATENT OFFICE.

EMILE MELIN, OF MARSEILLE, FRANCE.

ELASTIC WHEEL HUB.

Application filed April 10, 1919. Serial No. 289,015.

*To all whom it may concern:*

Be it known that I, EMILE MELIN, a citizen of the Republic of France, residing in Marseille, France, have invented certain new and useful Improvements in an Elastic Wheel Hub, of which the following is a specification.

The present invention relates to vehicle wheels; and its object, briefly stated, is the provision of a wheel having improved means for obtaining elasticity and flexibility in two directions simultaneously, viz: in a direction either perpendicular to the axle or radial, and in a lateral or transverse direction, the purpose being to deaden the shocks transmitted from the wheel to the axle.

According to the invention, a series of individual blocks of rubber or equivalent material is interposed between the axle and the spokes or body of the wheel, these blocks being preferably of rectangular section and removably and interchangeably arranged so that they can easily be replaced individually in case of necessity. Wheels thus rendered elastic in two directions can obviously have their rotary movements imparted to them by their hubs (in the case of driving wheels), or (in the case of non-driving wheels such as supporting wheels and guide wheels) the blocks can be so disposed as to avoid slipping and shearing. But in driving wheels the arrangement adopted for the purpose of obtaining elasticity both in a radial and in a lateral direction, also affords at the same time elasticity in the direction of rotation.

The constructions illustrated by way of example show hubs having special seats for the blocks, and, with the exception of Fig. 3, are assumed to represent a wheel which is fixed to its axle; but it is to be understood that the improved form of hub is applicable to all types of vehicle wheels whether fixed or demountable, and in the latter instance the demounting devices may be located either interiorly or exteriorly of the elastic parts of the hub, which will then be either detachable with the wheel or fixed to the hub.

In the accompanying drawing,

Fig. 1 is a view of the improved wheel partly in vertical section and partly in side elevation;

Fig. 2 is a fragmental transverse section on line 2—2'—2 of Fig. 1 but with the cushioning blocks omitted; and Fig. 3 is an enlarged detail section of a modification, taken substantially on line 3—3, Fig. 2.

Referring more particularly to the drawing, A indicates the tubular hub of the wheel, which is provided interiorly with a suitable anti-friction device, here shown as a sleeve B. The central portion of this hub is enlarged circumferentially, as indicated at $A^1$ in Figs. 1 and 2, and is formed with transverse seats of recesses $A^2$ (Fig. 1) for the reception of the ends of the shock-absorbing blocks or cushions F constructed of rubber or other suitable material and hereinafter referred to. The portion $A^1$ is encircled by a concentrically arranged ring E, the outer face of which is channeled while the inner face, which confronts the portion $A^1$ and is spaced therefrom, has seats or recesses $E^1$ therein to receive the outer ends of the blocks F, the two sets of seats $E^1$ and $A^2$ being disposed opposite each other as will be understood.

Against each side face of the annular enlargement $A^1$ there is arranged an annular cheek plate $C^1$ (Fig. 2), and similarly the ring E is provided with cheek plates $C^2$ at opposite sides thereof, the plates of each pair being disposed concentrically and in spaced relation. The two plates $C^1$ are detachably connected by bolts $D^1$ which pass through openings in the enlargement $A^1$, and the plates $C^2$ are detachably connected in like manner by bolts $D^2$ passing through openings in ring E. This ring or channel member E is secured to the wheel (assuming that the latter is of the wire-spoke type) by means of suitable projections $E^2$ on said ring to which the ends of the spoke wires $E^3$ are fastened, the central portions of the wires being engaged with cross-pins $E^4$ or the like provided upon the rim $E^5$.

The rubber blocks or cushions F, represented in Fig. 1 are fitted at their opposite ends in the seats $E^1$ and $A^2$, as previously stated, and hence are disposed radially of the wheel. These blocks are preferably rectangular in shape and have the same width as the hub A. Owing to this arrangement, the body of the wheel will obtain a resiliency relative to the axle both in a direction perpendicular to the axle and at the same time in a transverse or lateral direction, from which it follows that the movements of the wheel both vertically and laterally produced by shocks or by thrust will be deadened or cushioned simultaneously. This resiliency or mobility is obtained without any friction of metal on metal, whence economy in lubrication results.

To avoid fouling of the parts by mud and dust, the cheek plates $C^1$ and $C^2$ on each side of the wheel are connected by rubber washers H mounted in the spaces between the blocks F and held in place by the blocks themselves, the washers yielding very readily in consequence to either vertical or lateral deformation of the blocks when the wheel is in motion. It follows from this arrangement that the shock-absorbing blocks F have a double function: their vertical deformation or crushing enables the axle to assume an eccentric position relatively to the body of the wheel which deadens the vertical shocks; and their deformation by lateral shocks permits either variations of the angle formed by the plane of the wheel with the axle, or slight movements of the wheel relatively to its hub, such movements being deadened by the resiliency of the blocks which are held at one end on the periphery of the hub and at the other end on the inner circumference of the ring E. But it results equally from the arrangement described, in the case of driving wheels, in addition to the flexibility of suspension and the absorption of shocks in the two directions indicated, that the rubber blocks afford at the same time an elasticity in the direction of rotation of the wheel, that is to say, in a circumferential direction. Indeed, in these driving wheels the blocks serve moreover to limit the sudden movements incidental to starting and stopping and to braking.

In the case of wheels of other types, for instance wooden-spoke wheels and cast steel wheels, suitable devices will be adopted for securing the channel ring E to the body of the wheel.

Fig. 3 represents a modification of the hub construction previously described which is especially applicable to short hubs. In the case of hubs which yield in both directions, it may be advisable to limit the lateral or transverse movement by employing, for example, longer journals which afford an increased support for the rubber blocks. But this limitation of the lateral movement may be effected, however, without increasing the length of the hub journal by utilizing the arrangement shown in Fig. 3, according to which there is assumed to be an uneven number of blocks. The tubular hub member $A^4$ in this construction is formed with a central, circumferential rib $A^5$ which is interposed between the two sections or members $F^1$ and $F^2$ of the blocks. $C^3$ and $C^4$ are the cheek plates, D the fastening bolts for the plates $C^4$, and $E^1$ is the ring. The rib $A^5$ limits the lateral movements and permits the blocks to be made high enough to afford the desired elasticity in a radial or circumferential direction but this arrangement also results in a more perfect utilization of the action of the rubber. Take for instance a shock occurring when the wheel hits a curbstone, or a thrust in the direction indicated by the arrow K. Hub blocks, elastic in two directions would ordinarily act at one end only, where they are subjected to a vertical crushing force indicated by the arrows L; but with the present arrangement there is at the same time, in addition to this vertical deformation, a longitudinal deformation of the blocks (in the direction indicated by arrow M) between rib $A^5$ and cheeks $C^3$ and $C^4$.

Generally speaking, the number of blocks, as well as their cross-sectional shape and the quality of the rubber, may vary according to the elasticity sought; and the blocks may be formed with teeth or with perforations, may have sharp corners or rounded corners or may be circular in section, etc., though their cross sectional shape is preferably rectangular.

The changing of the rubber blocks, which are the only parts subject to wear, can be readily effected in the constructions illustrated, without requiring the removal of the wheel, it being necessary merely to remove the nuts from the bolts D, withdraw the front cheek plates (thereby uncovering the entire interior) and then turn the wheel on the ground in order to bring the damaged block to the top of the wheel. The block can then be readily removed, since it is not subjected to any load, after which a spare block can be substituted for it and the cheek plates and nuts then replaced.

These elastic hubs can be utilized to particular advantage on heavy wheels, whether driving wheels or supporting wheels, and they can supplement the solid tires which are incapable of affording the required elasticity, the transverse yield or elasticity avoiding axle breakage consequent upon shocks caused by the wheel striking against curbings.

I claim as my invention:

1. In a wheel, the combination of a hub; a ring encircling the hub and spaced therefrom, the confronting circumferential faces of said hub and ring being provided with companion seats which open at their ends through the opposite side faces thereof and are disposed transversely and in spaced relation; a series of structurally independent cushioning blocks interposed between said hub and ring in spaced relation to one another and having their opposite portions engaged in said seats, said cushioning blocks adapted to yield both laterally and radially of the wheel simultaneously, so as to impart resiliency to the wheel both laterally and radially; annular cheeks fixed to the said opposite side faces of the hub and ring and projecting across the end faces of the blocks for preventing displacement of the blocks, said cheeks being independent of each other; a rim encircling said ring and spaced therefrom; a tire carried by the rim; and connecting means between said rim and said ring.

2. In a wheel, the combination of a hub; a ring encicling the hub and spaced therefrom, the confronting circumferential faces of said hub and ring being provided with companion seats which are disposed transversely and in spaced relation; a series of structurally independent cushioning blocks interposed between said hub and ring in spaced relation to one another and having their opposite portions engaged in said seats, said cushioning blocks adapted to yield in two directions simultaneously, so as to impart resiliency to the wheel in both said directions simultaneously; a rim encircling said ring and spaced therefrom; a tire carried by the rim; and connecting means between said rim and said ring.

In testimony whereof I have signed this specification in the presence of two subscribing witnesses.

EMILE MELIN.

Witnesses:
A. MACFARLANE,
CH. BOLSK.